United States Patent
Asaad et al.

(10) Patent No.: US 9,830,354 B2
(45) Date of Patent: Nov. 28, 2017

(54) ACCELERATING MULTIPLE QUERY PROCESSING OPERATIONS

(71) Applicant: International Business Machines Corporation, Armonk, NY (US)

(72) Inventors: Sameh W. Asaad, Briarcliff Manor, NY (US); Parijat Dube, Yorktown Heights, NY (US); Hong Min, Poughkeepsie, NY (US); Bharat Sukhwani, Briarcliff Manor, NY (US); Mathew S. Thoennes, West Harrison, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 460 days.

(21) Appl. No.: 13/961,089

(22) Filed: Aug. 7, 2013

(65) Prior Publication Data

US 2015/0046427 A1    Feb. 12, 2015

(51) Int. Cl.
*G06F 17/30* (2006.01)

(52) U.S. Cl.
CPC .............. *G06F 17/30442* (2013.01)

(58) Field of Classification Search
CPC .............................................. G06F 17/30442
See application file for complete search history.

(56) References Cited

U.S. PATENT DOCUMENTS

| 738,247 A | 9/1903 | Schoof |
|---|---|---|
| 4,761,785 A | 8/1988 | Clark et al. |
| 5,210,870 A | 5/1993 | Baum et al. |
| 5,274,805 A * | 12/1993 | Ferguson ............ G06F 7/24 |
| 5,287,494 A | 2/1994 | Garcia et al. |
| 5,355,478 A | 10/1994 | Brady et al. |
| 5,579,514 A | 11/1996 | Turek et al. |
| 5,619,693 A | 4/1997 | Troisi |
| 5,619,713 A | 4/1997 | Baum et al. |
| 5,999,730 A | 12/1999 | Lewis |

(Continued)

FOREIGN PATENT DOCUMENTS

| EP | 2182448 A1 | 5/2010 |
|---|---|---|
| WO | 9954833 A2 | 10/1999 |

(Continued)

OTHER PUBLICATIONS

U.S. Appl. No. 13/961,092, filed Sep. 7, 2013.

(Continued)

*Primary Examiner* — Etienne Leroux
*Assistant Examiner* — Jared Bibbee
(74) *Attorney, Agent, or Firm* — Cantor Colburn LLP; Rabin Bhattacharya

(57) ABSTRACT

Embodiments include methods, systems and computer program products a for offloading multiple processing operations to an accelerator includes receiving, by a processing device, a database query from an application. The method also includes performing analysis on the database query and selecting an accelerator template from a plurality of accelerator templates based on the analysis of the database query. The method further includes transmitting an indication of the accelerator template to the accelerator and executing at least a portion of the database query on the accelerator.

13 Claims, 4 Drawing Sheets

(56) References Cited

U.S. PATENT DOCUMENTS

| | | |
|---|---|---|
| 6,282,541 B1 | 8/2001 | Hoa et al. |
| 6,292,569 B1 | 9/2001 | Shear et al. |
| 6,330,559 B1 | 12/2001 | Azuma |
| 6,385,612 B1 | 5/2002 | Troisi |
| 6,748,386 B1 | 6/2004 | Li |
| 6,891,834 B1 | 5/2005 | Dally et al. |
| 7,158,996 B2 | 1/2007 | Croisettier et al. |
| 7,539,867 B2 | 5/2009 | Bolosky et al. |
| 8,135,747 B2 | 3/2012 | Anzalone et al. |
| 8,185,867 B2* | 5/2012 | Robinson .................. G06F 8/00 717/105 |
| 8,244,718 B2 | 8/2012 | Chamdani et al. |
| 8,261,020 B2 | 9/2012 | Krishnaprasad et al. |
| 8,321,476 B2 | 11/2012 | Kirk et al. |
| 8,392,463 B2 | 3/2013 | Gautam et al. |
| 8,645,623 B1 | 2/2014 | O'Shea et al. |
| 8,688,683 B2* | 4/2014 | Simon ............... G06F 17/30463 707/713 |
| 9,251,219 B2 | 2/2016 | Asaad et al. |
| 2002/0078023 A1* | 6/2002 | Lawton ............. G06F 17/30864 |
| 2003/0018630 A1* | 1/2003 | Indeck ............... G06F 17/30477 |
| 2003/0212668 A1 | 11/2003 | Hinshaw et al. |
| 2004/0111708 A1 | 6/2004 | Calder et al. |
| 2004/0158818 A1 | 8/2004 | Smith et al. |
| 2006/0224563 A1* | 10/2006 | Hanson ............. G06F 17/30463 |
| 2007/0005925 A1 | 1/2007 | Burkley et al. |
| 2007/0169059 A1* | 7/2007 | Halambi ............... G06F 8/4452 717/160 |
| 2007/0277036 A1* | 11/2007 | Chamberlain ...... G06F 9/44505 713/171 |
| 2008/0183688 A1* | 7/2008 | Chamdani ......... G06F 17/30442 |
| 2008/0189252 A1 | 8/2008 | Branscome et al. |
| 2008/0250011 A1 | 10/2008 | Haubold et al. |
| 2009/0007076 A1 | 1/2009 | Al-Omari et al. |
| 2009/0106194 A1 | 4/2009 | Furusho |
| 2009/0132638 A1 | 5/2009 | Kim et al. |
| 2009/0313436 A1 | 12/2009 | Krishnaprasad et al. |
| 2010/0005077 A1* | 1/2010 | Krishnamurthy . G06F 17/30463 707/E17.136 |
| 2010/0042624 A1 | 2/2010 | Min et al. |
| 2010/0185954 A1 | 7/2010 | Simernitski et al. |
| 2010/0268995 A1 | 10/2010 | Goodman et al. |
| 2010/0293338 A1 | 11/2010 | Krishnaprasad et al. |
| 2010/0299499 A1 | 11/2010 | Golla et al. |
| 2011/0167056 A1* | 7/2011 | Khanolkar ........ G06F 17/30463 707/718 |
| 2012/0017126 A1 | 1/2012 | Yamano |
| 2012/0047126 A1* | 2/2012 | Branscome ....... G06F 17/30519 707/714 |
| 2012/0079141 A1* | 3/2012 | Ushiku ............... G06F 13/1652 710/26 |
| 2012/0084543 A1* | 4/2012 | Pross .................... G06F 9/3881 713/1 |
| 2012/0124055 A1 | 5/2012 | Deubel et al. |
| 2012/0124070 A1 | 5/2012 | Mishra et al. |
| 2012/0136875 A1 | 5/2012 | Pan et al. |
| 2012/0246156 A1 | 9/2012 | Gupta et al. |
| 2012/0246170 A1 | 9/2012 | Iantorno |
| 2012/0278339 A1 | 11/2012 | Wang |
| 2012/0310882 A1 | 12/2012 | Werner et al. |
| 2013/0054942 A1 | 2/2013 | Serrano |
| 2013/0282687 A1 | 10/2013 | Ah-Pine et al. |
| 2014/0351239 A1* | 11/2014 | Davis ................ G06F 17/30483 707/718 |
| 2015/0046428 A1 | 2/2015 | Asaad et al. |
| 2015/0046430 A1 | 2/2015 | Asaad et al. |
| 2015/0046453 A1 | 2/2015 | Asaad et al. |
| 2015/0046475 A1 | 2/2015 | Asaad et al. |
| 2015/0046478 A1 | 2/2015 | Asaad et al. |
| 2015/0046486 A1 | 2/2015 | Asaad et al. |
| 2015/0254294 A1* | 9/2015 | Marais .................. G06F 11/073 707/690 |
| 2016/0012107 A1 | 1/2016 | Asaad et al. |

FOREIGN PATENT DOCUMENTS

| | | |
|---|---|---|
| WO | 2007061430 A1 | 5/2007 |
| WO | 2007143198 A2 | 12/2007 |
| WO | 2012024585 A1 | 2/2012 |
| WO | 2013055812 A1 | 4/2013 |

OTHER PUBLICATIONS

U.S. Appl. No. 14/018,646, filed Sep. 5, 2013.
U.S. Appl. No. 14/018,647, filed Sep. 5, 2013.
U.S. Appl. No. 13/961,094, filed Aug. 7, 2013.
U.S. Appl. No. 13/961,095, filed Aug. 7, 2014.
U.S. Appl. No. 14/018,650, filed Sep. 5, 2013.
U.S. Appl. No. 14/018,651, filed Sep. 5, 2013.
Bala et al, "Dynamo: A Transparent Dynamic Optimization System," In Proceedings of Programming Language Design and Implementation (PLDI), 2000, pp. 1-12.
Bond et al., "Probabilistic Calling Context," In Proceedings of Object Oriented Programming Systems Languages and Applications (OOPSLA) 2007, pp. 1-15.
Franke, et al., "Dynamically Adjustable Tournament Tree", U.S. Appl. No. 12/246,751; Priority Date: Oct. 7, 2008; 2 pgs.
Sukhwani, et al., "A Hardware/Software Approach for Database Query Acceleration with FPGAs", Int. J. Parallel Prog., Published Online: Oct. 28, 2014; Springer; pp. 1-31.
International Search Report—Written Opinion—International Application No. PCT/US 12/44120; International Filing Date: Jun. 26, 2012; dated: Sep. 19, 2012; 1-4 pages.
International Search Report; International Application No. PCT/US 12/44120; International Filing Date: Jun. 26, 2012; dated: Sep. 19, 2012; 1-7 pages.
Iyer, Balakrishna R. "Hardware Assisted Sorting in IBM's DB2 DBMS", International Conference on Management of Data, COMAD 2005b, Dec. 20-22, 2005, Computer Society of India, 2005; 9 pgs.
Kim et al., "COBRA: A Framework for Continuous Profiling and Binary Re-Adaption," Technical Report 08-016, Department of Computer Science and Engineering University of Minnesota, May 9, 2008, pp. 1-125.
Lu et al., "Design and Implementation of a Lightweight Dynamic Optimization System," Journal of Instruction Level Parallelism, Apr. 2004, pp. 1-24.
Merten et al, "A Hardware-Driven Profiling Scheme for Identifying Program Hot Spots to Support Runtime Optimizaiton," Proceedings of the 26th Annual International Symposium of Computer Architecture (ISCA), May 1999, pp. 136-147.
Odaira et al. "Efficient Runtime Tracking of Allocation Sites in Java," In Proceedings of Virtual Execution Environments (VEE), Mar. 2010, ACM, pp. 109-120.
Serrano, M. J. "Trace Construction Using Enhanced Performance Monitoring," In Proceedings of the ACM international Conference on Computing Frontiers (CF 13). ACM, New York, NY Arcticle 34, 10 pages.
Stack, Michael, "The Theory Behind the z/Architecture Sort Assist Instructions", Neon Enterprise Software, Inc., SHARE in San Jose—Aug. 10-15, 2008, Session 8121; 100 pgs.
Tuck et al., "SoftSig: Software-Exposed Hardware Signatures for Code Analysis and Optimization," SIGARCH Comput. Archit. News 36, 1 (Mar. 2008), 145-156.
U.S. Appl. No. 13/961,092, filed Aug. 7, 2013 entitled Hardware Implementation of a Tournament Tree Sort Algorithm.
z/Architecture: "Principles of Operation"; Tenth Edition, Sep., 2012; Publication No. SA22-7832-09; copyright IBM Corp.; 1990-2012; p. 1-1568.
Zhuang et al., "Accurate, efficient, and adaptive calling context profiling," SIGPLAN not. 41, 6 (Jun. 2006), 263-271.
Gosink et al., "Query-Driven Visualization of Time-Varying Adaptive Mesh Refinement Data", IEEE Transactions on Visualization and Computer Graphics, vol. 14, No. 6, Nov./Dec. 2008; pp. 1715-1722.

(56) References Cited

OTHER PUBLICATIONS

Sukhwani et al., "Database Analytics Acceleration using FPGAs", PACT' 12, Sep. 19-23, 2012; Minneapolis, Minnesota, USA; Copyright 2012 ACM, 10 pgs.
Xu et al., "Query decomposition based on ontology mapping in data integration system", Third International Conference on Natural Computation (ICNC 2007), 2007 IEEE; pp. 1-5.
Cheng et al., "An Efficient Hybrid Join Algorithm: A DB2 Prototype", Data Base Technology Institute, IBM Santa Teresa Laboratory, San Jose, CA 95161, USA, 1991 IEEE, pp. 171-180.
Geambasu et al., "Vanish: Increasing Data Privacy with Self-Destructing Data", 18th USENIX Security Symposium; 52 pgs.
Hey et al., "Cyberinfrastructure for e-Science", Science 308, 817 (2005); cover page and pp. 817-821.
Jenson, Jonas Julian "Reconfigurable FPGA Accelerator for Databases," Master Thesis, University of Oslo Department of Informatics; Aug. 1, 2012; 107 pgs.
Kumar et al., "Improved Algorithms and Data Structures for Solving Graph Problems in External Memory", Department of EECS, Northwestern university, Evanston, IL 60208, 1996 IEEE, pp. 169-176.
Ledjfors, Calle "High-Level GPU Programming Domain-specific optimization and inference", Doctoral dissertation, 2008, Department of Computer Science Lund University; 120 pgs.
Levitt et al., "An Image Understanding Environment for DARPA Supported Research and Applications, First Annual Report" Advanced Decision Systems Mountain View, CA 1991, 80 pgs.
Pawlowski, et al., "Parallel Sorting of Large Data Volumes on Distributed Memory Multiprocessors", Parallel Computer Architectures, Springer Berlin Heidelberg, 1993, 246-264, 19 pgs.
Rahkila, P., "Grain—A Java Data Analysis System for Total Data Readout", Nuclear Instruments and Methods in Physics Research Section A: Accelerators, Spectrometers, Detectors and Associated Equipment 595.3 (2008): 637-642; 13 pgs.
Singh et al., "Introduction to the IBM Netezza Warehouse Appliance," Proceedings CASCON '11 Proceedings fo the 2001 conference of the Center for Advanced Studies on Collaborative Research; pp. 385-386.
Stonebraker, Michael R., "Architectural Options for Object-Relational DBMSs", White Paper (1997), 16 pgs.
Sukhwani, et al., "Database Analytics Acceleration using FPGAs," PACT '12 Proceedings of the 21st International Conference on Parallel Architectures and Compilation Techniques; pp. 411-420.
Vaidya et al., "A Novel Multicontext Coarse-Grained Join Accelerator for Column-Oriented Databases," International Conference on Engineering of Reconfigurable Systems and Algorithms (ERSA), 2009; 7 pgs.
Yagi et al., "Gmm Foreground Segmentation Processor Based on Address Free Pixel Streams", Acoustics, Speech and Signal Processing (ICASSP), 2012 IEEE International Conference on IEEE, 2012, pp. 1653-1656.
U.S. Appl. No. 12/246,751, filed Oct. 7, 2008.
U.S. Appl. No. 14/328,933, filed Jul. 11, 2014.
U.S. Appl. No. 14/483,999, filed Dec. 29, 2014.
U.S. Appl. No. 14/741,490, filed Jun. 17, 2015.
Sukhwani et al., "A Hardware/Software Approach for Database Query Acceleration with FPGAs", Int. J. Parallel Prog., Published online: Oct. 28, 2014; Springer; pp. 1-31.
CSE 326 Data Structure "Pointers", dated Jan. 19, 2005; pp. 1-6.
Stack, Michael "The Theory Behind the z/Architecture Sort Assist Instructions", SHARE in San Jose, Sesssion 8121; Aug. 10, 2008, pp. 1-100.
U.S. Appl. No. 14/977,832, filed Dec. 22, 2015; "Tunable Hardware Sort Engine for Performing Composite Sorting Algorithms".
U.S. Appl. No. 14/977,835, filed Dec. 22, 2015; "Tunable Hardware Sort Engine for Performing Composite Sorting Algorithms".

* cited by examiner

ACCELERATING MULTIPLE QUERY PROCESSING OPERATIONS

BACKGROUND

The present invention relates to accelerating multiple query processing operations, and more specifically, to an integrated hardware device for accelerating multiple query processing operations.

Currently, hardware accelerators, such as Field Programmable Gate Arrays (FPGAs), are used to accelerate individual query processing operations. These query processing operations include, but are not limited to, sort operations, decompression operations, predicate evaluation operations, and join operations.

In general, a single database query includes multiple processing operations. In some cases, accelerating only one of the processing operations on an accelerator may not be sufficient to increase the processing speed of the entire database query. For example, the database query may include more than one expensive, or time consuming, processing operation. In addition, the overhead cost incurred by the interface between an accelerator and a host may not be justified by accelerating only one of the query processing operations.

SUMMARY

According to an embodiment, a method for offloading multiple processing operations to an accelerator includes receiving, by a processing device, a database query from an application. The method also includes performing analysis on the database query and selecting an accelerator template from a plurality of accelerator templates based on the analysis of the database query. The method further includes transmitting an indication of the accelerator template to the accelerator and executing at least a portion of the database query on the accelerator.

According to another embodiment, a system for offloading multiple processing operations to an accelerator includes a processing device configured to receive a database query from an application. The processor is also configured to perform analysis on the database query and to select an accelerator template from a plurality of accelerator templates based on the analysis of the database query. The system also includes an accelerator configured to receive an indication of the accelerator template from the processing device and to execute at least a portion of the database query.

According to another embodiment, a computer program product including a non-transitory computer readable storage medium having computer readable program code stored thereon that, when executed, performs a method. The method includes receiving a database query from an application. The method also includes performing analysis on the database query and selecting an accelerator template from a plurality of accelerator templates based on the analysis of the database query. The method further includes transmitting an indication of the accelerator template to the accelerator and executing at least a portion of the database query on the accelerator.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments disclosed herein include methods, systems and computer program products for accelerating multiple query processing operations. In exemplary embodiments, a method of offloading multiple processing operations within a query to a single accelerator and effective pipelining the different operations on the accelerator is provided. In exemplary embodiments, accelerating multiple operations in a single accelerator reduces the interfacing overhead among operations and between accelerator and host.

In exemplary embodiments, acceleration of different database query operations is performed on the accelerator in a parallel/pipelined fashion. Offloading multiple processing operations to a single accelerator results in increased end-to-end performance of the database query. For example, the performance is improved by acceleration of a larger portion of the database query, as well as better amortization of the setup, teardown and data transfer overhead between the host and the accelerator. Moreover, pipelining these operations on the accelerator provides the acceleration of multiple functions with improved overall query processing throughput on the accelerator.

Figure 1:
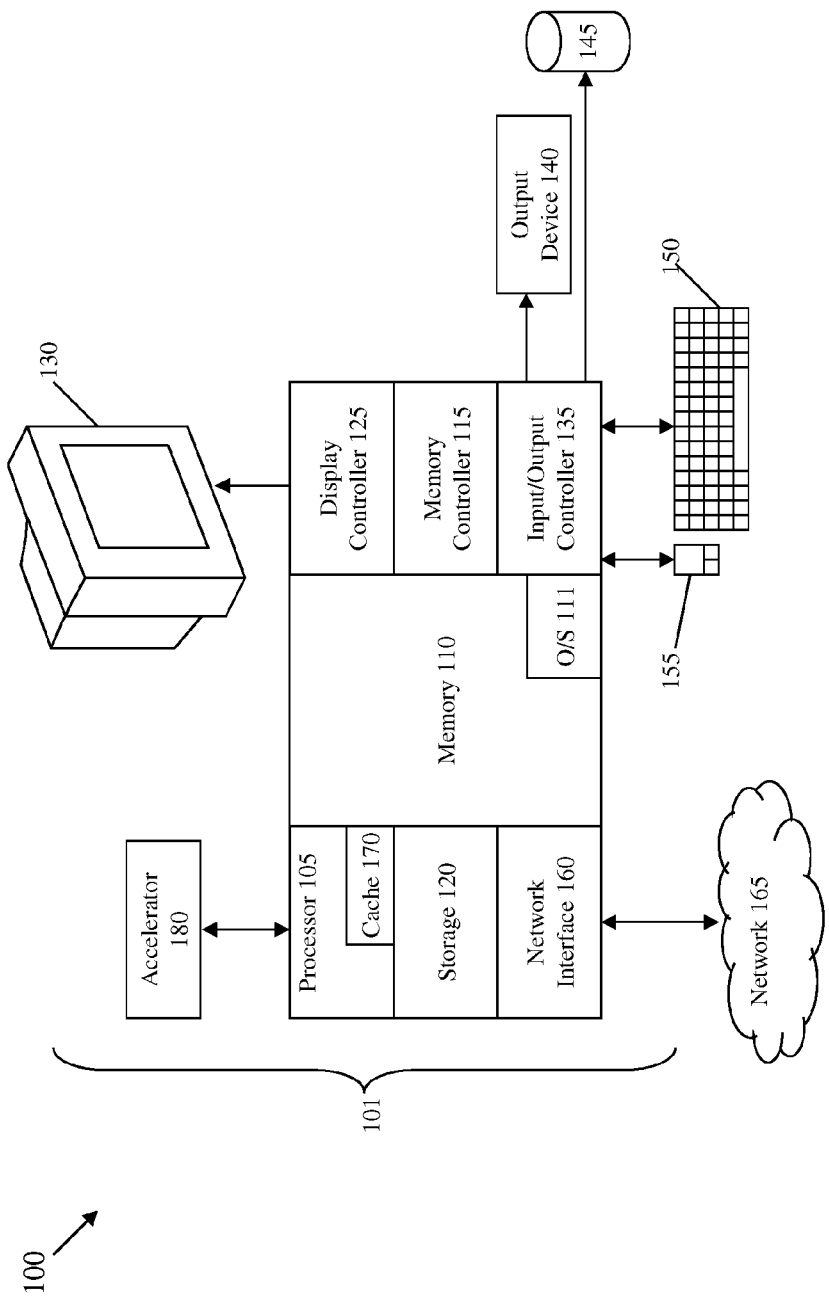
FIG. 1 depicts a block diagram of a computer system for practicing the teachings herein according to an embodiment.

Referring now to FIG. 1, a block diagram of an exemplary computer system 100 for use with the teachings herein is shown. The methods described herein can be implemented in hardware software (e.g., firmware), or a combination thereof. In an exemplary embodiment, the methods described herein are implemented in hardware, and is part of the microprocessor of a special or general-purpose digital computer, such as a personal computer, workstation, minicomputer, or mainframe computer. The system 100 therefore includes general-purpose computer 101.

In an exemplary embodiment, in terms of hardware architecture, as shown in FIG. 1, the computer 101 includes a processor 105, memory 110 coupled via a memory controller 115, a storage device 120, and one or more input and/or output (I/O) devices 140, 145 (or peripherals) that are communicatively coupled via a local input/output controller 135. The input/output controller 135 can be, for example, but not limited to, one or more buses or other wired or wireless connections, as is known in the art. The input/ output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. The storage device 120 may include one or more hard disk drives (HDDs), solid state drives (SSDs), or any other suitable form of storage.

The processor 105 is a computing device for executing hardware instructions or software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing instructions. The processor 105 may include a cache 170, which may be organized as a hierarchy of more cache levels (L1, L2, etc.).

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The instructions in memory 110 may include one or more separate programs, each of which comprises an ordered listing of executable instructions for implementing logical functions. In the example of FIG. 1, the instructions in the memory 110 include a suitable operating system (OS) 111. The operating system 111 essentially controls the execution of other computer programs and provides scheduling, input-output control, file and data management, memory management, and communication control and related services.

In an exemplary embodiment, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In an exemplary embodiment, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In an exemplary embodiment, network 165 can be a managed IP network administered by a service provider. The network 165 may be implemented in a wireless fashion, e.g., using wireless protocols and technologies, such as Wi-Fi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the instructions in the memory 110 may further include a basic input output system (BIOS) (omitted for simplicity). The BIOS is a set of essential routines that initialize and test hardware at startup, start the OS 111, and support the transfer of data among the storage devices. The BIOS is stored in ROM so that the BIOS can be executed when the computer 101 is activated.

When the computer 101 is in operation, the processor 105 is configured to execute instructions stored within the memory 110, to communicate data to and from the memory 110, and to generally control operations of the computer 101 pursuant to the instructions. In exemplary embodiments, the computer system 100 includes one or more accelerators 180 that are configured to communicate with the processor 105. The accelerator 180 may be a field programmable gate array (FPGA) or other suitable device that is configured to perform specific processing tasks. In exemplary embodiments, the computer system 100 may be configured to offload certain processing tasks to an accelerator 180 because the accelerator 180 can perform the processing tasks more efficiently than the processor 105.

Figure 2:
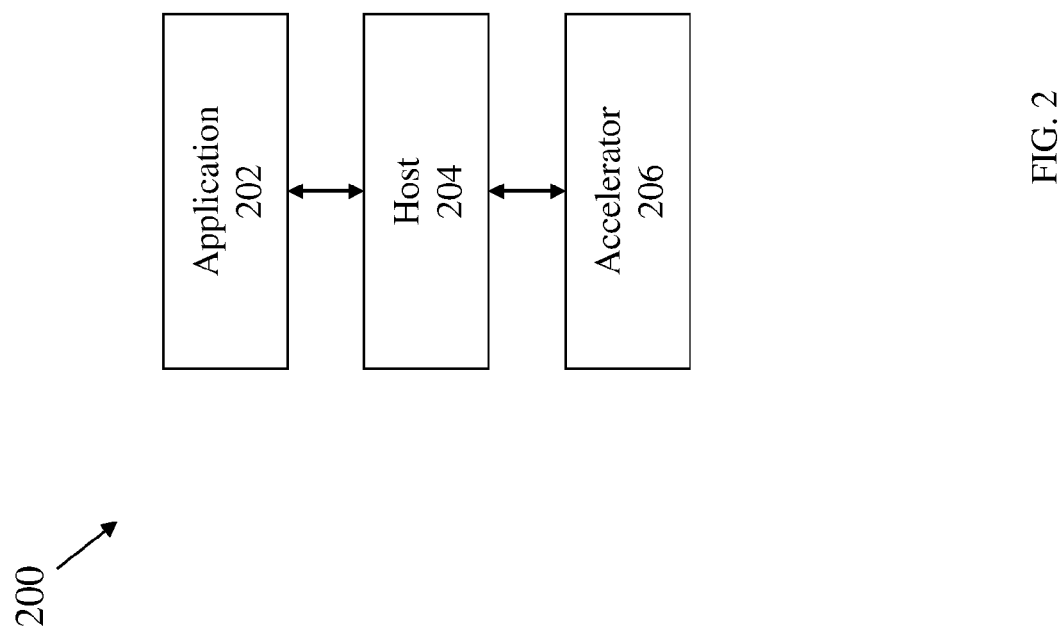
FIG. 2 depicts a block diagram of a system for accelerating multiple query processing operations in accordance with an exemplary embodiment.

Referring now to FIG. 2, a block diagram illustrating a system 200 having an accelerator 206 for accelerating multiple query processing operations in accordance with an exemplary embodiment is shown. The system 200 includes a host 204, which may be a computer as shown in FIG. 1 having a central processing unit configured to execute database management software. In exemplary embodiments, the host 204 receives queries from an application 202 and responsively offloads one or more query processing operations to the accelerator 206. In exemplary embodiments, the accelerator 206 is an integrated hardware device. For example, the accelerator 206 may be a FPGA.

Figure 3:
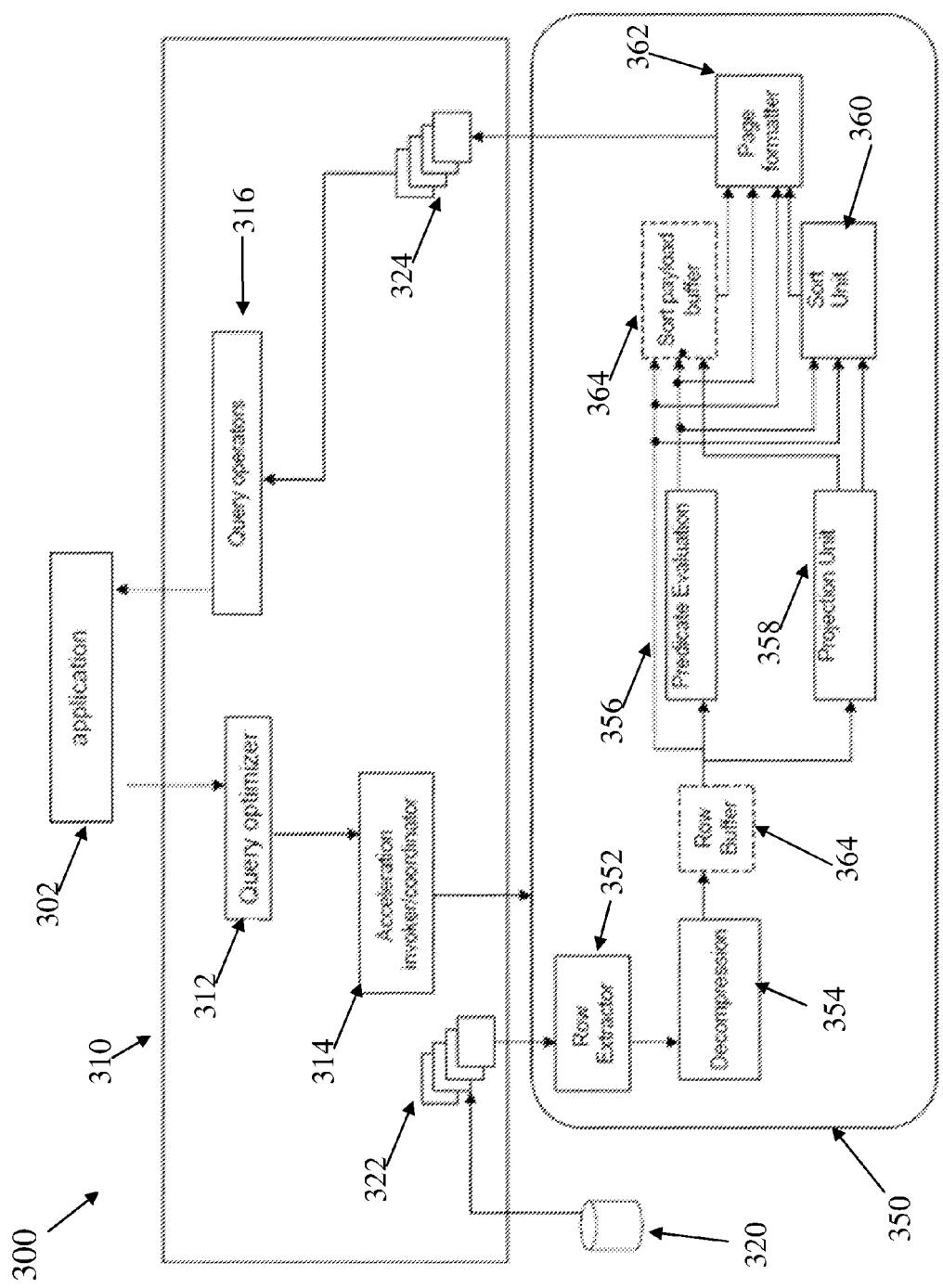
FIG. 3 depicts a block diagram of a system having an integrated hardware device for accelerating multiple query processing operations in accordance with an exemplary embodiment.

Referring now to FIG. 3, a block diagram illustrating a system 300 having an integrated hardware device 350 for accelerating multiple query processing operations in accordance with an exemplary embodiment is shown. In exemplary embodiments, the host 310 includes a query optimizer 312, which receives a query from an application and performs analysis on the query. Based on the analysis of the query, the query optimizer 312 selects an accelerator template from a plurality of accelerator templates. In exemplary embodiments, each of the plurality of accelerator templates is a stored processing configuration that the integrated hardware device 350 is capable of executing. Once the query optimizer 312 selects an accelerator template, the acceleration coordinator 314 transmits a signal to the integrated hardware device 350, which causes the integrated hardware device 350 to implement the selected template.

In exemplary embodiments, the system 300 also includes a storage device 320 that is accessed by the host 310. The storage device 320 is configured to store database data and to provide data pages 322 to the host 310. The host 310 is configured to provide the data page addresses for the input and output pages 322 to the integrated hardware device 350. In exemplary embodiments, database pages 322 are brought into the integrated hardware device 350 via input direct memory access and output pages are sent back to the host 310 via output direct memory access.

In exemplary embodiments, the host 310 may execute certain query operations 316 and the integrated hardware device 350 operates in parallel to reduce the response time to the application 302. The host 310 feeds a block of data, the data pages 322, to the integrated hardware device 350 to begin processing and continues to retrieve data from the storage device 320. In exemplary embodiments, the integrated hardware device 350 is configured to store processed data in output buffer and to continue processing as long as there is data being input. In exemplary embodiments, the integrated hardware device 350 manages both tasks of pulling input data from the host 310 and returning the output data to the host 310. The host 310 may be configured to execute various query operations 316 that are not offloaded to the integrated hardware device 350.

In exemplary embodiments, each of the accelerator templates includes a plurality of acceleration modules that each correspond to different database functions. For example, the acceleration modules may include, but are not limited to, a row extraction module, a decompression module, an evaluation module, a projection module, a sort module and a formatting module. In exemplary embodiments, the integrated hardware device 350 is capable of executing a plurality of acceleration templates. The number and configuration of the acceleration modules present in each acceleration template is selected based on the functionality required by the query operations that are offloaded to the integrated hardware device 350.

In exemplary embodiments, the acceleration modules are arranged on the integrated hardware device 350 in a feed-forward pipelined fashion, with each acceleration module feeding into the next acceleration module. In exemplary embodiments, different acceleration modules can have different data processing rates. In order to maintain continuous data flow and minimize stalls, multiple slower acceleration modules may be operated in parallel in order to be rate-matched with the faster acceleration modules. In addition, intermediate buffers may be disposed between acceleration modules in the pipelined configuration.

Continuing with reference to FIG. 3, the integrated hardware device 350 is configured with an accelerator template that includes a plurality of acceleration modules, which include a row extraction module 352, a decompression module 354, a predicate evaluation module 356, a projection module 358, a sort module 360 and a formatting module 362. In addition, the accelerator template includes one or more buffers 364. In exemplary embodiments, the query optimizer 312 on the host 310 selects an accelerator template having a number and configuration of the acceleration modules based on the functionality required by the query operations that are offloaded to the integrated hardware device 350.

Figure 4:
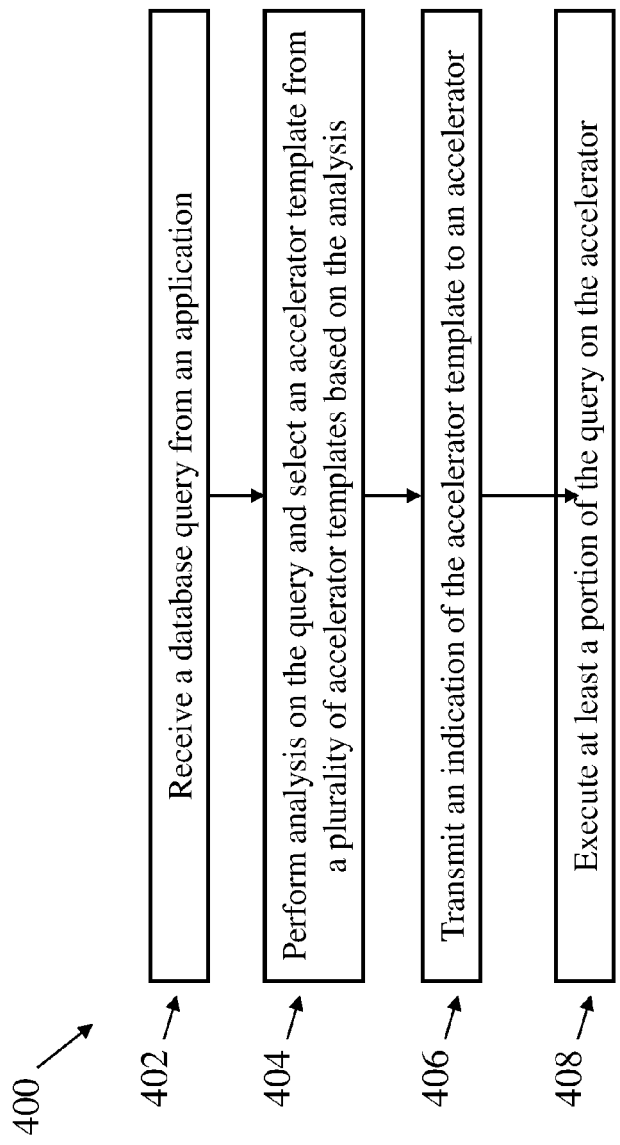
FIG. 4 depicts a flow diagram of a method for accelerating multiple query processing operations in accordance with an exemplary embodiment.

Referring now to FIG. 4, a flow diagram illustrating a method 400 for offloading multiple processing operations to a single accelerator according to an embodiment is shown. As shown at block 402, the method 400 includes receiving a database query from an application. Next, as shown at block 404, the method 400 includes performing analysis on the query and selecting an accelerator template from a plurality of accelerator templates based on the analysis. In exemplary embodiments, each of the plurality of accelerator templates has a configuration of accelerator modules which are configured to efficiently execute various query operations. As shown at block 406, the method 400 includes transmitting an indication of the accelerator template to the accelerator. In exemplary embodiments, the accelerator is a FPGA that is capable of being configured to execute each of the plurality of accelerator templates. Next, the accelerator executes at least a portion of the query, as shown at block 408.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The disclosed flowchart and block diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system comprising:
  a processing device configured to:
    select an accelerator template from a plurality of accelerator templates based on an analysis of a database query, wherein each of the plurality of templates represent different stored processing configurations that the accelerator are capable of executing and wherein each of the plurality of accelerator templates includes a plurality of pipelined acceleration modules arranged on an integrated hardware device in a feed-forward pipelined fashion, such that each of the different acceleration modules can have different data processing rates; and
    execute at least a portion of the database query according to the accelerator template, wherein during the execution of the at least a portion of the database query on the accelerator, the accelerator manages a pulling of input data from a host device and returning an output data to the host device.

2. The system of claim 1, wherein the accelerator template comprises a configuration of a plurality of accelerator modules that are configured to efficiently execute the portion of the database query.

3. The system of claim 2, wherein the plurality of accelerator modules comprises two or more of the following:
  a row extraction module;
  a decompression module;
  an evaluation module;
  a projection module;
  a join module;
  an aggregation module;
  a sort module; and
  a formatting module.

4. The system of claim 2, wherein the accelerator template further comprises one or more buffers.

5. The system of claim 1, wherein the accelerator is a field programmable gate array.

6. The system of claim 1, wherein at least a second portion of the database query is executed by the processing device.

7. The system of claim 1, wherein each of the plurality of accelerator templates comprises a configuration of accelerator modules configured to efficiently execute different database query operations.

8. A computer program product, comprising:
  a non-transitory computer readable storage medium having computer readable program code stored thereon that, when executed, performs a method, the method comprising:

selecting an accelerator template from a plurality of accelerator templates based on an analysis of a database query, wherein each of the plurality of templates represent stored processing configurations that the accelerator are capable of executing and wherein each of the plurality of accelerator templates includes a plurality of acceleration modules arranged on an integrated hardware device in a feed-forward pipelined fashion, such that each of the different acceleration modules can have different data processing rates; and executing at least a portion of the database query on the accelerator according to the accelerator template, wherein during the execution of the at least a portion of the database query on the accelerator, the accelerator manages a pulling of input data from a host device and returning an output data to the host device.

9. The computer program product of claim 8, wherein the accelerator template comprises a configuration of a plurality of accelerator modules that are configured to efficiently execute the portion of the database query.

10. The computer program product of claim 9, wherein the plurality of accelerator modules comprises two or more of the following:
   a row extraction module;
   a decompression module;
   an evaluation module;
   a projection module;
   a join module;
   an aggregation module;
   a sort module; and
   a formatting module.

11. The computer program product of claim 9, wherein the accelerator template further comprises one or more buffers.

12. The computer program product of claim 8, wherein the accelerator is a field programmable gate array.

13. The computer program product of claim 8, wherein at least a second portion of the database query is executed by the processing device.

* * * * *